(12) United States Patent
Gauthier et al.

(10) Patent No.: US 11,988,006 B1
(45) Date of Patent: *May 21, 2024

(54) POPUP CAMPER

(71) Applicant: Hardsider, Inc., Cincinnati, OH (US)

(72) Inventors: Noel Gauthier, Cincinnati, OH (US); Paul Eric Price, Cincinnati, OH (US); Randall Kent, Cincinnati, OH (US); Konrad Billetz, San Juan, PR (US); Robert Schmidt, San Juan, PR (US); Joel Green, San Juan, PR (US)

(73) Assignee: Hardsider, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,033

(22) Filed: Nov. 1, 2023

Related U.S. Application Data

(63) Continuation of application No. 18/084,725, filed on Dec. 20, 2022, now Pat. No. 11,840,857.

(51) Int. Cl.
*E04H 15/06* (2006.01)
*B32B 3/12* (2006.01)
*B32B 5/02* (2006.01)
*B32B 5/06* (2006.01)
*B32B 5/18* (2006.01)
*B32B 5/24* (2006.01)
(Continued)

(52) U.S. Cl.
CPC ............... *E04H 15/06* (2013.01); *B32B 3/12* (2013.01); *B32B 5/02* (2013.01); *B32B 5/06* (2013.01); *B32B 5/18* (2013.01); *B32B 5/245* (2013.01); *B60J 7/1621* (2013.01); *B60P 3/341* (2013.01); *B60P 3/38* (2013.01); *E04B 1/3445* (2013.01); *B32B 2250/05* (2013.01); *B32B 2250/40* (2013.01); *B32B 2250/44* (2013.01); *B32B 2307/304* (2013.01); *B32B 2605/00* (2013.01)

(58) Field of Classification Search
CPC ......... E04H 15/06; B60J 7/1621; B60P 3/341; B60P 3/38; E04B 1/3445
USPC ........... 135/88.13–88.17, 901; 296/156, 159, 296/160, 164, 173; 52/71, 79.5
See application file for complete search history.

(56) References Cited

U.S. PATENT DOCUMENTS 3,061,359 A * 10/1962 Pearlman ................ B60R 5/042
296/26.06
3,093,150 A * 6/1963 Schaftener ................ B60P 3/38
135/132
(Continued)

FOREIGN PATENT DOCUMENTS

JP 07232588 A * 9/1995

*Primary Examiner* — Robert Canfield
(74) *Attorney, Agent, or Firm* — Maskell Law PLLC; Benjamin E. Maskell

(57) ABSTRACT

Disclosed is a popup camper having a base, a top, a first sidewall having a first edge, a second sidewall having a second edge, a third sidewall connected to the first sidewall at the first edge, connected to the second sidewall at the second edge, connected to the top at a third edge, and connected to the base at a fourth edge, a hinge connecting the base and the top, the hinge opposite the third sidewall, wherein the top can be disposed in an open position or a folded position, wherein in the open position the top is hingedly rotated away from the base to form an interior space between the top, base, first sidewall, second sidewall, and third sidewall, and wherein in the folded position the top is hingedly rotated towards the base collapsing the interior space.

17 Claims, 12 Drawing Sheets

(51) Int. Cl.
  *B60J 7/16* (2006.01)
  *B60P 3/34* (2006.01)
  *B60P 3/38* (2006.01)
  *E04B 1/344* (2006.01)

(56) References Cited

U.S. PATENT DOCUMENTS

| | | | | |
|---|---|---|---|---|
| 3,191,829 A * | 6/1965 | Davis | ............... | B60P 3/38 224/329 |
| 3,411,819 A * | 11/1968 | Tyree | ............... | B60P 3/38 296/176 |
| 3,499,175 A * | 3/1970 | Orberg | ............... | A47C 17/82 5/119 |
| 3,603,330 A * | 9/1971 | Halldorson | ............... | B60P 3/38 135/148 |
| 3,632,153 A * | 1/1972 | Knudsen | ............... | B60P 3/34 296/26.02 |
| 3,768,855 A * | 10/1973 | Laue | ............... | E04B 1/3442 296/26.02 |
| D231,443 S * | 4/1974 | Wayman | ............... | D12/403 |
| 3,924,365 A * | 12/1975 | Orberg | ............... | B60P 3/38 52/63 |
| 3,953,066 A * | 4/1976 | Hamilton | ............... | B60P 3/34 135/88.13 |
| 5,544,671 A * | 8/1996 | Phillips | ............... | B60P 3/341 135/88.14 |
| 5,758,679 A * | 6/1998 | Tamburelli | ............... | E04H 15/06 135/88.16 |
| 5,931,176 A * | 8/1999 | Isler | ............... | E04H 15/06 296/159 |
| 6,394,531 B2 * | 5/2002 | Thompson | ............... | B60P 3/341 296/26.02 |
| D820,192 S * | 6/2018 | Currid | ............... | D12/403 |
| 10,077,574 B1 * | 9/2018 | Currid | ............... | B60P 3/343 |
| 10,086,684 B1 * | 10/2018 | Stamm, Jr. | ............... | B60J 7/1621 |
| 10,596,951 B1 * | 3/2020 | Williams | ............... | B60P 3/343 |
| 10,890,010 B1 * | 1/2021 | Chang | ............... | E04H 15/20 |
| 10,985,689 B2 * | 4/2021 | Wickramasekera | .. | E04B 1/3445 |
| 11,110,846 B2 * | 9/2021 | Thompson | ............... | B60P 3/34 |
| 11,130,437 B1 * | 9/2021 | Tatro | ............... | B60P 3/39 |
| 11,648,869 B2 * | 5/2023 | Freshour | ............... | B60P 3/34 296/173 |
| 11,840,857 B1 * | 12/2023 | Gauthier | ............... | B32B 3/12 |
| 2002/0008406 A1 * | 1/2002 | Phillips | ............... | B60P 3/341 296/100.1 |
| 2005/0017540 A1 * | 1/2005 | Leigh | ............... | B60P 3/34 296/173 |
| 2011/0185645 A1 * | 8/2011 | Minko | ............... | E04B 1/3445 52/79.5 |
| 2019/0202333 A1 * | 7/2019 | Delgadillo, Jr. | ...... | B60J 7/1657 |
| 2020/0040599 A1 * | 2/2020 | Laue | ............... | E04H 1/1205 |
| 2020/0071925 A1 * | 3/2020 | Shum | ............... | E04B 1/68 |
| 2020/0392722 A1 * | 12/2020 | Chinn | ............... | E04B 1/34363 |
| 2021/0025190 A1 * | 1/2021 | Montesalvo | ............... | E04H 15/54 |
| 2021/0404170 A1 * | 12/2021 | Hariri | ............... | E04B 1/34336 |
| 2022/0017008 A1 * | 1/2022 | Davis | ............... | B60P 3/341 |
| 2023/0087816 A1 * | 3/2023 | Pratt | ............... | B60R 9/06 296/100.1 |
| 2023/0103642 A1 * | 4/2023 | Freshour | ............... | B60P 3/34 296/173 |

\* cited by examiner

POPUP CAMPER

This application is a continuation of U.S. patent application Ser. No. 18/084,725 filed Dec. 20, 2022, the entirety of which is hereby incorporated by reference.

BACKGROUND OF THE INVENTION

Field of the Invention

The embodiments of the invention relate popup camper, and more particularly, to a wedge style popup camper. Although embodiments of the invention are suitable for a wide scope of applications, it is particularly suitable for attachment to a pickup truck for recreational camping.

Discussion of the Related Art

Popup campers of the related art include, generally, three-sided "wedge style" campers and four-sided "box style" campers. One such wedge style camper is disclosed in U.S. Pat. No. 11,130,437 of Tatro. The Tatro camper includes a top hingedly connected to the base, two triangular sidewalls, and a rectangular end wall opposite the hinge. The triangular sidewalls are substantially formed from two rigid panels having a central folding line such that the panels fold inwards when the top is hingedly rotated towards the based and straighten when the top is hingedly rotated away from the base. Once the top is fully rotated away from the base and the sidewalls fully erected, the end wall can be erected and attached to the top. The end wall is substantially formed from a single rigid panel and may have openings for doors or windows, See e.g., Tatro, FIG. 2E.

Problems, however, exist in the related art in as much as multiple steps can be required to erect a wedge style camper. For example, after erecting the wedge style camper of the related art, the end wall needs to be separately erected. Because the end wall is large, it may be difficult to lean and reach to gain a sufficient hold on the end panel to rotate it into position. Additionally, after the end panel of the related art is in position, it then needs to be attached to the top and sidewalls. The attachment point of the end wall can be a point of weakness, repeated strain, and prospective failure. The awkward step of attaching the end wall required can take time, delaying deployment and stowage of the camper. A need exists for a popup camper that can be quickly deployed and stowed without having to separately attach and detach an end wall.

SUMMARY OF THE INVENTION

Accordingly, embodiments of the invention are directed to a popup camper that substantially obviates one or more of the problems due to limitations and disadvantages of the related art.

An object of embodiments of the invention is to provide a popup camper that can be erected without separately attaching sidewalls.

Another object of embodiments of the invention is to provide a popup camper that can be collapsed without separately detaching sidewalls.

Yet another object of embodiments of the invention is to provide a popup camper having hard sides.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, popup camper includes a base, a top, a first sidewall having a first edge, a second sidewall having a second edge, a third sidewall connected to the first sidewall at the first edge, connected to the second sidewall at the second edge, connected to the top at a third edge, and connected to the base at a fourth edge, a first panel of the third sidewall, a second panel of the third sidewall, a third panel of the third sidewall, a fourth panel of the third sidewall, a fifth panel of the third sidewall, a sixth panel of the third sidewall, The first panel is adjacent to the third edge, the second panel, the third panel, and the fourth panel, the second panel is adjacent to the base, the first panel, the fifth panel, and the sixth panel, the third panel is adjacent the first edge, the first panel, and the fifth panel, the fourth panel is adjacent the first panel, the second edge, and the sixth panel, the fifth panel is adjacent the first edge, the second panel, and the third panel, and the sixth panel is adjacent the second panel, the second edge, and the fourth panel.

In another aspect, popup camper includes a base, a top, a collapsible sidewall, a first edge of the collapsible sidewall, a second edge of the collapsible sidewall, a third edge of the collapsible sidewall connected to the top, a fourth edge of the collapsible sidewall connected to the base, a major folding line of the collapsible sidewall, a first minor folding line of the collapsible sidewall extending from a first corner of the collapsible sidewall to the major folding line, a second minor folding line of the collapsible sidewall extending from a second corner of the collapsible sidewall to the major folding line, a first panel of the collapsible sidewall, a longest edge of the first panel adjacent the third edge of the collapsible sidewall, a second edge of the first panel adjacent the major folding line, a third edge of the first panel adjacent the first minor folding line, a fourth edge of the first panel adjacent the second minor folding line, a second panel of collapsible sidewall, a longest edge of the second panel adjacent the fourth edge of the collapsible sidewall, a second edge of the second panel adjacent the major folding line and the second edge of the first panel, a third panel of the collapsible sidewall, a longest edge of the third panel adjacent the third edge of the first panel and the first minor folding line a second edge of the third panel adjacent the major folding line, and a third edge of the third panel adjacent the first edge of the collapsible sidewall.

In yet another aspect, a popup camper includes a base frame, a top frame, a first sidewall connecting the base frame to the top frame, a second sidewall connecting the base frame to the top frame, a third sidewall connecting the base frame to the top frame, wherein the top frame can be disposed in an open position and a folded position. In the open position, the first, second, and third sidewalls are extended and substantially planar and in the folded position the first, second, and third sidewalls are folded inwards while remaining connected to the base frame and the top frame.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figure 1:
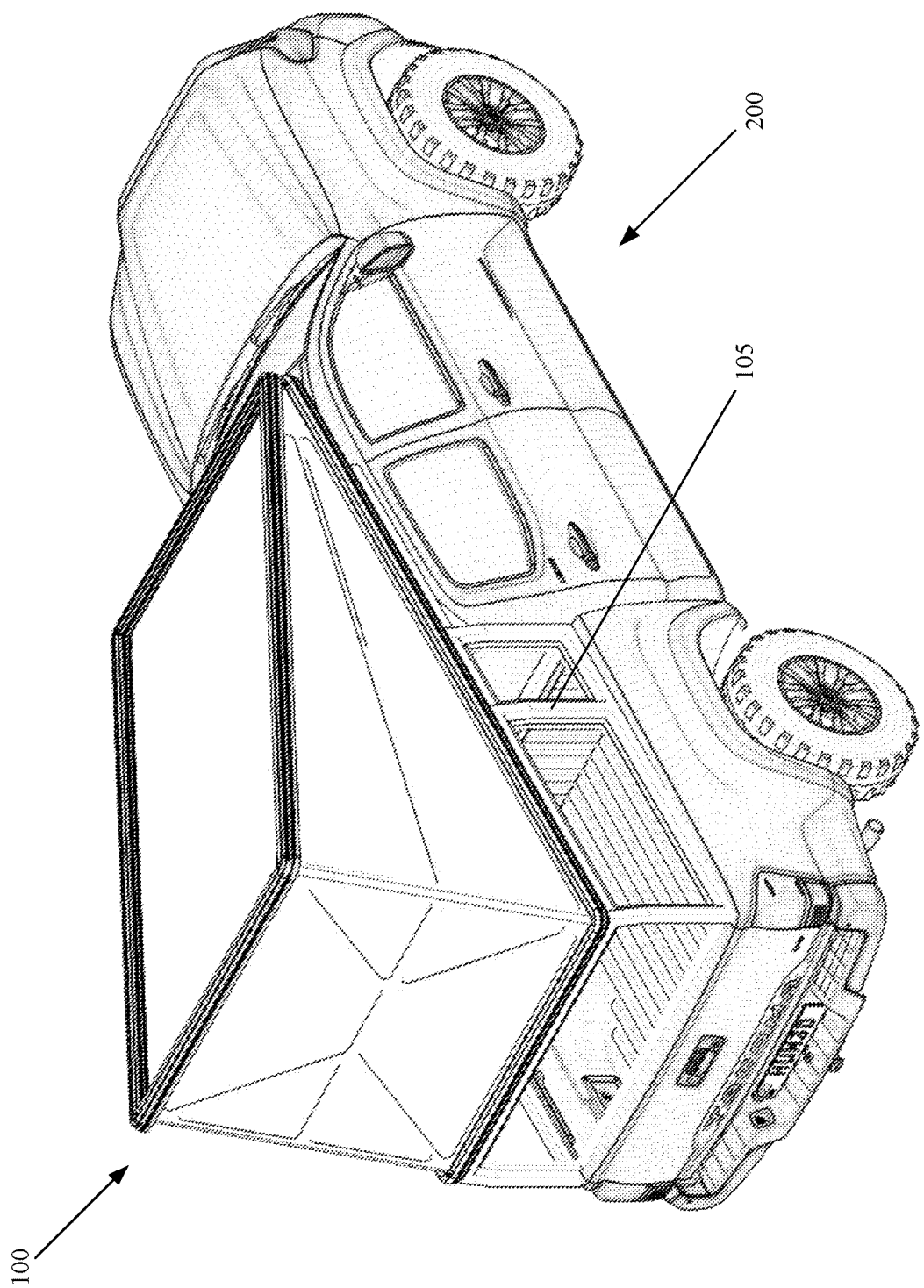
FIG. 1 is a perspective view of a popup camper in an open position according to an exemplary embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Various of the figures show sidewalls of a popup camper assembled from one or more panels. Embodiments of the invention contemplate that the panels can be covered with a fabric material to retain and position the panels and to seal the camper from the weather. In the figures, however, the fabric material has been variously omitted as not to obscure the relative size, position, and orientation of the panels with respect to one another. Accordingly, the embodiments disclosed in the figures should not be construed to omit fabric layer(s).

FIG. 1 is a perspective view of a popup camper in an open position according to an exemplary embodiment of the invention. As shown in FIG. 1, a popup camper 100 can be mounted on a frame 105. The frame 105 can be mounted over a bed of a pickup truck 200. In preferred embodiments of the invention, the popup camper 100 can extend over a cab of the pickup truck 200. As will be discussed in greater detail in conjunction with FIGS. 2A-3B, the sidewalls of the popup camper can be formed from one or more rigid panels. The top of the popup camper 100 can be hingedly a base such that the camper can be folded flat into a closed position for storage and travel and opened to an open position (as shown in FIG. 1) to enable use of an interior space.

Figure 2A:
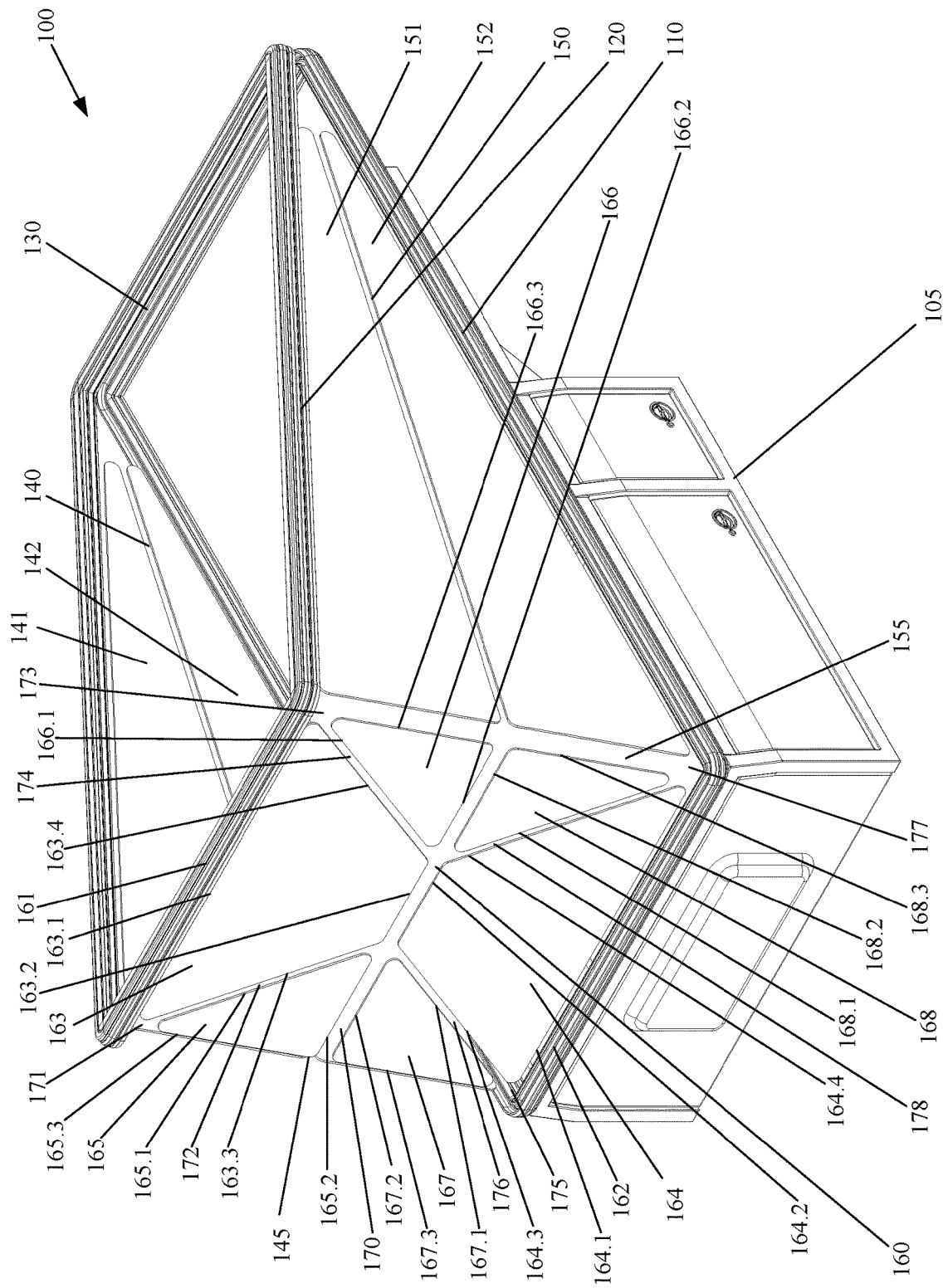
FIG. 2A and FIG. 2B are perspective views of a popup camper in an open position according to an exemplary embodiment of the invention.
Figure 2B:
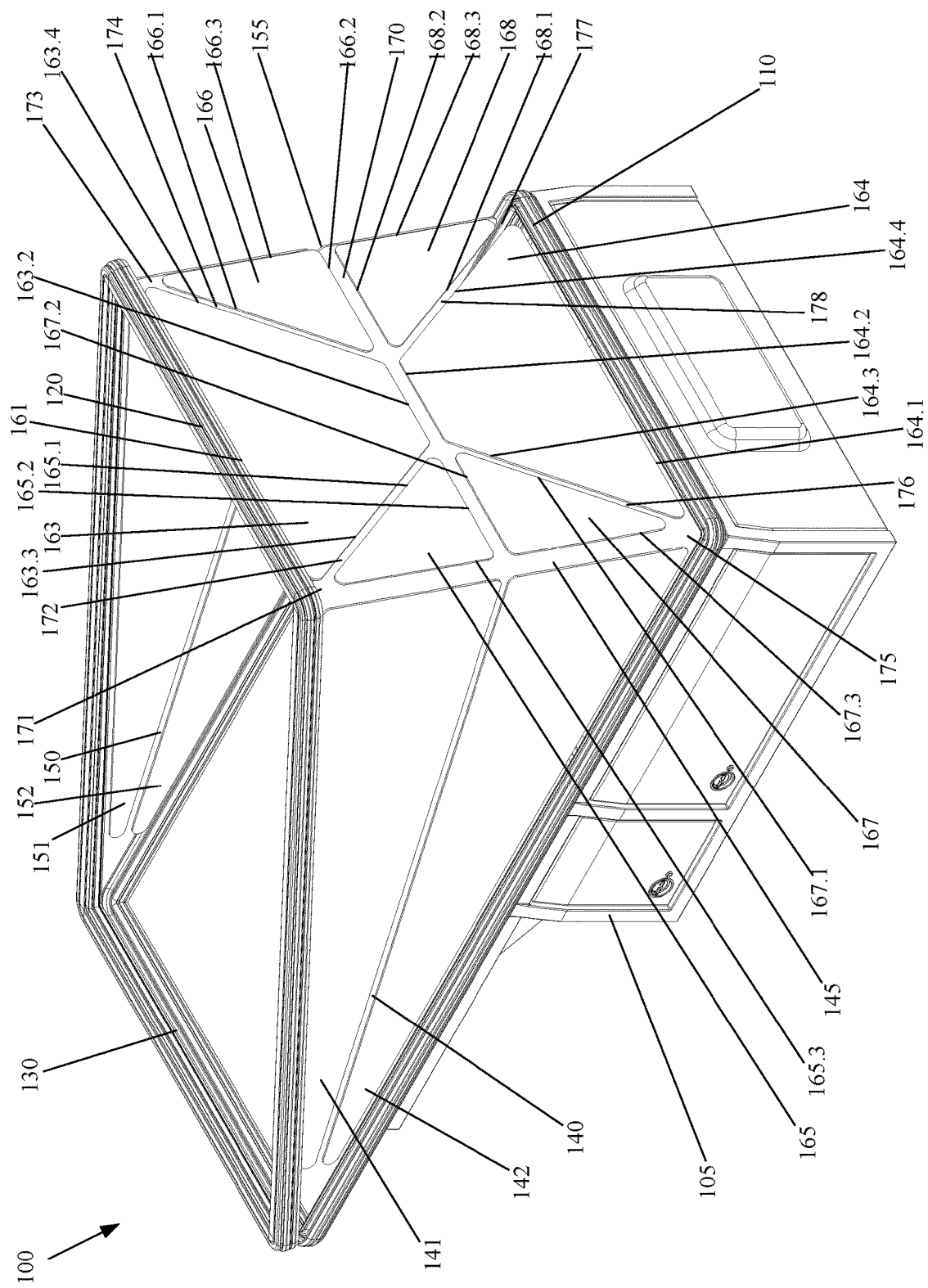

FIG. 2A and FIG. 2B are perspective views of a popup camper in an open position according to an exemplary embodiment of the invention. As shown in FIG. 2A and FIG. 2B, a popup camper 100 can have a support frame 105, base 110, top 120, hinge 130, left side 140, right side 150, and end side 160. Base 110, top 120, left side 140, right side 150, and end side 160 can define an interior space (not labeled). Left side 140 can have panels 141 and 142. Right side 150 can have panels 151 and 152. End side 160 can have panels 163, 164, 165, 166, 167, and 168.

The left side 140 can be connected to the base 110, the top 120, and end side 160. The right side 150 can be connected to the base 110, the top 120, and end side 160. The end side 160 can be connected to the base 110, the top 120, left side 140, and right side 150. The left side 140 can be connected to end side 160 at edge 145. The right side 150 can be connected to end side 160 at edge 155. The end side 160 can be connected to the top 120 at edge 161. The end side 160 can be connected to the base 110 at edge 162. End side 160 can have corners 171, 173, 175, and 177.

Major folding line 170 can cross the end side 160. The major folding line 170 can substantially bisect end side 160 from edge 145 to edge 155 such that equal portions of the end side 160 are disposed above and below the major folding line 170. Minor folding lines 172, 174, 176, and 178 can extend from corners 171, 173, 175, and 177 (respectively) to the major folding line 170.

Panel 163 of end side 160 can have a trapezoid shape. A longest edge 163.1 of panel 163 can be adjacent top edge 161. Edge 163.2 of panel 163 can be adjacent major folding line 170. Edge 163.3 of panel 163 can be adjacent minor folding line 172. Edge 163.4 of panel 163 can be adjacent minor folding line 174.

Panel 164 of end side 160 can have a trapezoid shape. A longest edge 164.1 of panel 164 can be adjacent top edge 161. Edge 164.2 of panel 164 can be adjacent major folding line 170. Edge 164.3 of panel 164 can be adjacent minor folding line 176. Edge 164.4 of panel 164 can be adjacent minor folding line 178.

Panel 165 of end side 160 can have a triangle shape. A longest edge 165.1 can be adjacent minor folding line 172 and edge 163.3 of panel 163. Edge 165.2 can be adjacent edge major folding line 170 and panel 167. Edge 165.3 can be adjacent edge 145 and panel 141.

Panel 166 of end side 160 can have a triangle shape. A longest edge 166.1 can be adjacent minor folding line 174 and edge 163.4 of panel 163. Edge 166.2 can be adjacent edge major folding line 170 and panel 168. Edge 166.3 can be adjacent edge 155 and panel 151.

Panel 167 of end side 160 can have a triangle shape. A longest edge 167.1 can be adjacent minor folding line 176 and edge 164.3 of panel 164. Edge 167.2 can be adjacent edge major folding line 170 and edge 165.2 of panel 165. Edge 167.3 can be adjacent edge 145 and panel 152.

Panel 168 of end side 160 can have a triangle shape. A longest edge 168.1 can be adjacent minor folding line 178 and edge 164.4 of panel 164. Edge 168.2 can be adjacent edge major folding line 170 and edge 166.2 of panel 166. Edge 168.3 can be adjacent edge 145 and panel 152.

The panels and sides can be covered with fabric layers (not shown) to retain the panels in their relative positions and connect the sides and panels to the top 120 and bottom 130. The fabric layers are not shown in FIG. 2A and FIG. 2B to more clearly illustrate the relative position of panels. Although it may appear that the panels of FIG. 2A and FIG.

2B are disconnected, they can be interconnected via fabric layers. Fabric layers as will be discussed in greater detail in conjunction with FIG. 5. In FIG. 2A and FIG. 2B, top 120 is shown as open or transparent for clarity. In preferred embodiments, top 120 can be formed from fabric layers or one or more rigid panels. In FIG. 2A and FIG. 2B, base 110 has been illustrated as a continuous platform for clarity. In preferred embodiments, the base 110 can have varying configurations of access panels or open portions to facilitate human movement between a bed of a truck and the popup camper 100.

Base 110 can be connected to top 120 via hinge 130. Hinge 130 can be formed from fabric layers connected to base 110 and top 120. Hinge 130 can be formed from other types of mechanical hinges known to those of skill in the art and covered with a fabric layer for weather sealing.

The popup camper 100 of FIG. 2A and FIG. 2B is illustrated in an open position where the top 120 is hingedly rotated away from the base 110 so that sidewalls 140, 150, and 160 are fully extended. The popup camper can alternatively be disposed in a closed position where the top 120 is hingedly rotated towards the base 110 and the sidewalls 140, 150, and 160 fold inwards. The end side 160 can be permanently connected to edges 145, 155, 161, and 162. In transitioning the popup camper 100 from an open position to a closed position, the end side 160 can remain connected to edges 145, 155, 161, and 162. The novel shape and configuration of panels in sides 140, 150, and 160 allow the popup camper 100 to transition from an open position to a closed position and back to an open position without disconnecting sides from any edges. This represents an improvement over the related art where traditionally (1) at least one side had to be erected or attached after the camper was opened and subsequently detached before collapsing the camper; or (2) at least one side was formed entirely from fabric. In contrast, in the present invention, all sides can be formed from one or more rigid panels and no sides must be attached or detached during assembly or break down. Rigid panels can be superior to fabric-only panels because rigid panels can have superior insulating properties, superior noise attenuation properties, provide superior security, and can present a neater, cleaner appearance.

As will be described in greater detail in conjunction with FIG. 5, sides 140, 150, and 160 can be formed substantially from one or more rigid panels disposed between fabric layers. The panels can be partially or completely retained in their relative positions between the fabric layers by a retention mechanism such as stitching, rivets, adhesive, Velcro, snaps, buttons, or methods as would be apparent to one of skill in the art for coupling rigid panels to fabric.

In preferred embodiments of the invention, the panels can "float" between fabric layers in as much as the panels are minimally retained in their relative position with a retention mechanism or entirely unrestrained by a retention mechanism. When a panel floats it can be substantially retained in its relative position by the edges of the corresponding side wall and the other panels of the side wall. The fabric layers can be formed from a pliable fabric that can stretch in one or more dimensions. The fabric layers can be formed from a blend of synthetic materials such as nylon or rayon and elastic materials such as rubber or spandex. In combination, the stretchability of the fabric layers, the spaces between the panels, and the floating nature of the panels can facilitate easy transition between an open position and a closed position. As will be discussed in greater detail in conjunction with FIG. 3A and FIG. 3B, space 169 can form between the panels of end wall 160 when the camper is transitioned between an open position and a closed position.

In transitioning between an open position and a closed position, sidewall 150 can fold inwards such that exterior faces of panels 151 and 152 are adjacent to one another. Sidewall 140 can fold inwards such that exterior faces of panels 141 and 142 are adjacent to one another. End wall 160 can fold inwards (as shown in transition view FIG. 3A and FIG. 3B) such that: exterior faces of panels 163, 165, and 166 are adjacent; exterior faces of panels 164, 167, and 168 are adjacent; exterior faces of panels 163 and 164 are adjacent; interior faces of panels 165 and 167 are adjacent; and interior faces of panels 166 and 168 are adjacent.

As used herein, the term adjacent can mean in substantial proximity or next to. Edges of a panel or a side can be adjacent when they are next to another edge even though they may be separated by a small distance or connected via an intermediary structure such as fabric. Faces of a panel or side can be adjacent when they are next to another face even though they may be separated by a small distance or partially separated by an intermediary structure such as another panel. In a closed position, exterior faces of panels 163 and 164 are considered to be adjacent even though panels 163 and 164 may be separated in a sandwich arrangement by panels 165 and 167 on one side and panels 166 and 168 on another side. Similarly, in a closed position, interior faces of panels 165 and 167 are considered to adjacent even though they may be separated in a sandwich arrangement by panels 141 and 142. In another example, in an open position, edge 163.3 of panel 163 can be considered adjacent to edge 165.1 of panel 165 even though they are illustrated as not touching.

Embodiments of the invention disclose major folding lines and minor folding lines. A folding line, whether major or minor, can be an area where the sides of a popup camper are configured to fold. Major folding line 170 can bisect end side 160. Three or more panels can have an edge on major folding line 170. Minor folding lines 172, 174, 176, and 178 can separate two or more panels and can intersect of connect to a major folding line. Although major folding lines and minor folding lines have been disclosed and described in conjunction with the foregoing embodiment, the terms should not be construed as limited to the embodiment. Indeed, a popup camper may have two or more major folding lines that share an edge with varying number of panels and a popup camper may have minor folding lines in varying numbers and sharing edges with varying number of panels.

Figure 3A:
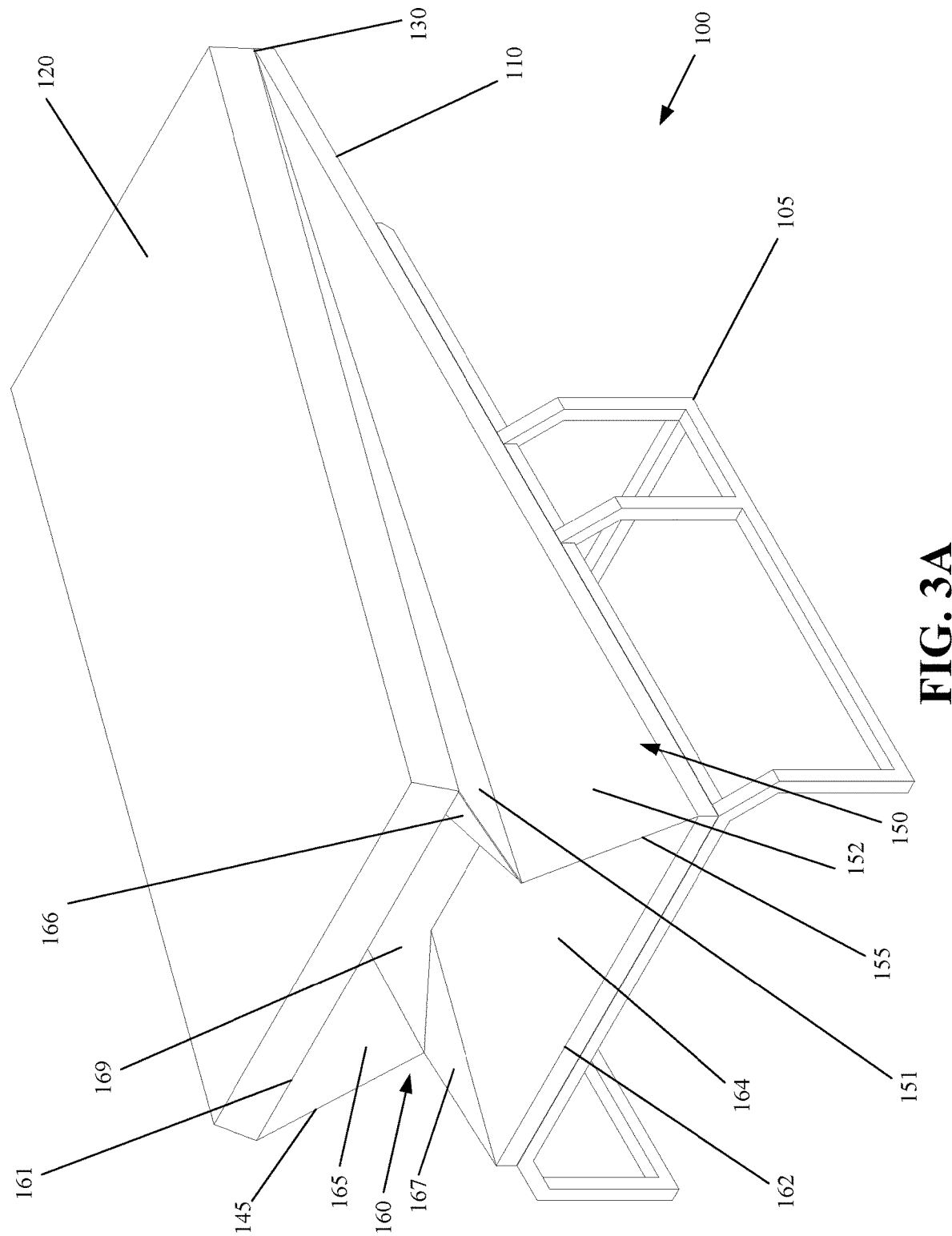
FIG. 3A and FIG. 3B are perspective views of a popup camper in a partially opened position according to an exemplary embodiment of the invention.
Figure 3B:
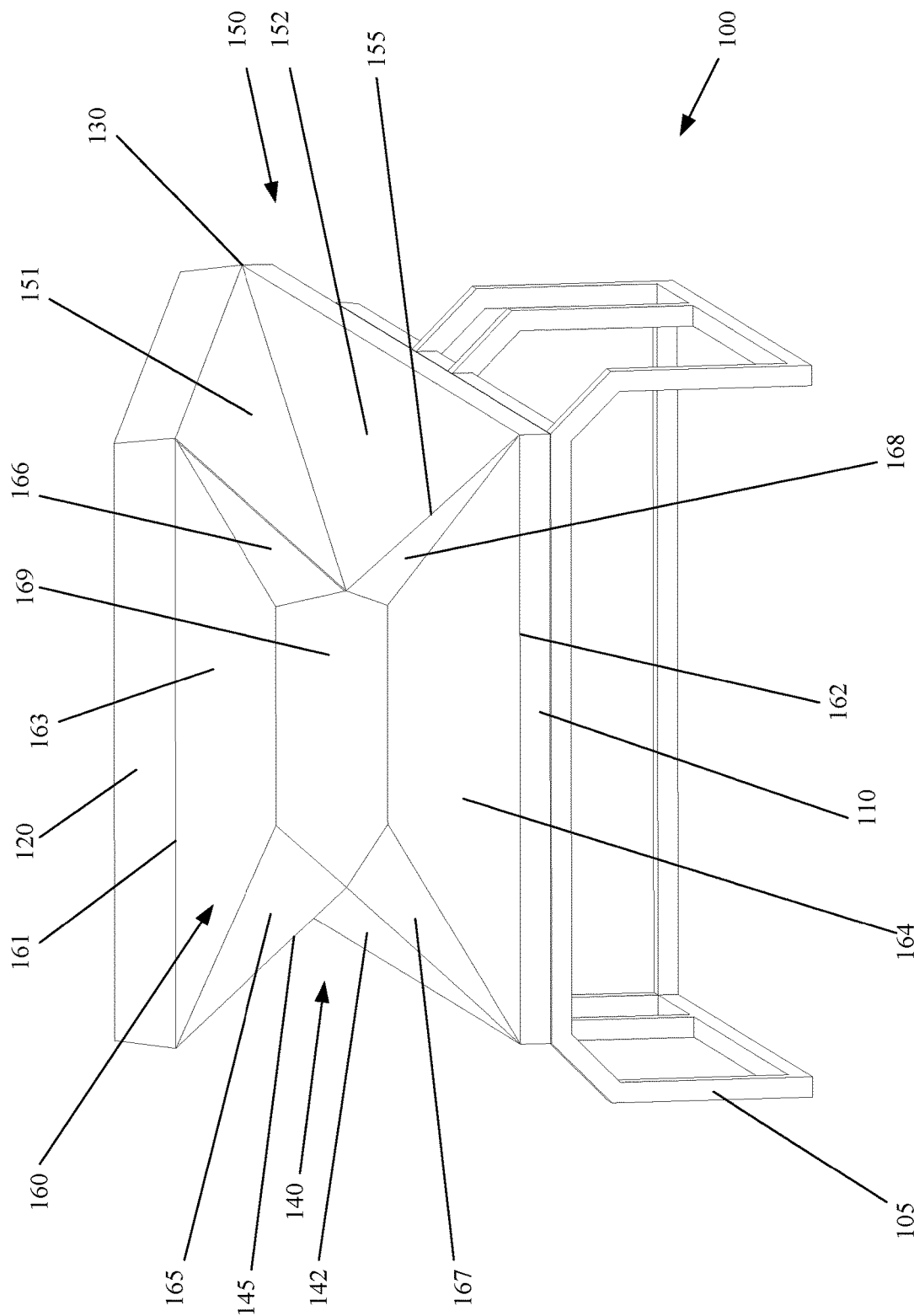

FIG. 3A and FIG. 3B are perspective views of a popup camper in a partially opened position according to an exemplary embodiment of the invention. The illustrations of FIG. 3A and FIG. 3B have been simplified over those shown in FIG. 2A and FIG. 2B to illustrate the manner in which a popup camper can fold. In this regard panels have been illustrated in a general sense without precise regard to the spaces between them and the fabric layers that cover them and accordingly, is not intended to limit the scope of the invention. As shown in FIG. 3A and FIG. 3B, a popup camper in a transition between an open and a closed position can have a support frame 105, base 110, top 120, hinge 130, left side 140, right side 150, and end side 160. Base 110, top 120, left side 140, right side 150, and end side 160 can define an interior space (not labeled). Left side 140 can have two panels: panel 142 and panel 141 (not shown; see FIG. 2B). Right side 150 can have panels 151 and 152. End side 160 can have panels 163, 164, 165, 166, 167, and 168.

The left side 140 can be connected to the base 110, the top 120, and end side 160. The right side 150 can be connected to the base 110, the top 120, and end side 160. The end side 160 can be connected to the base 110, the top 120, left side 140, and right side 150. The left side 140 can be connected to end side 160 at edge 145. The right side 150 can be connected to end side 160 at edge 155. The end side 160 can be connected to the top 120 at edge 161. The end side 160 can be connected to the base 110 at edge 162.

When transitioning from an open position to a closed position, sides 140 and 150 can fold inwards. As sides 140 and 150 fold inwards, end side 160 can collapse and fold inwards. As the popup camper is collapsed, panels 165, 166, 167, and 168 of end side 160 can have compound movement with respect to their positions shown in FIG. 2A and FIG. 2B. For example, panel 165 can rotate counter clockwise with respect to end side 160 (as shown in FIG. 3B) to facilitate folding of left side 140 and can also rotate inwards to facilitate folding of end side 160. Panels 166, 167, and 168 can have similar movement. To further facilitate fluid folding some "play" in the system can be advantageous. In preferred embodiments of the invention panels of walls can float between fabric layers and fabric layers can be formed from stretchy material. In the embodiment illustrated in FIG. 3A and FIG. 3B, gap 169 can form when the camper is transitioned between and open and closed position. Although gap 169 is illustrated as central to 163, 164, 165, 166, 167, and 168, the illustration of gap 169 is intended to approximate the relative movement of floating panels while transitioning between open and closed positions. In commercial embodiments, gap 169 may manifest in other locations or many locations depending on the geometry of the panels, attachments (if any) of the panels to any other structures, and other forces acting upon the system. In general, however, floating allows binding forces between panels to be relieved at the point of prospective binding rather than preventing the system from folding or causing damage to the rigid panels. Although gap 169 is illustrated as a visible gap, the panels in preferred embodiments of the invention can be covered in fabric and the gap 169 can be obscured from view. Then the popup camper is fully collapsed, the gap 169 can be substantially closed relieving stretching forces on the fabric layers.

Figure 4:
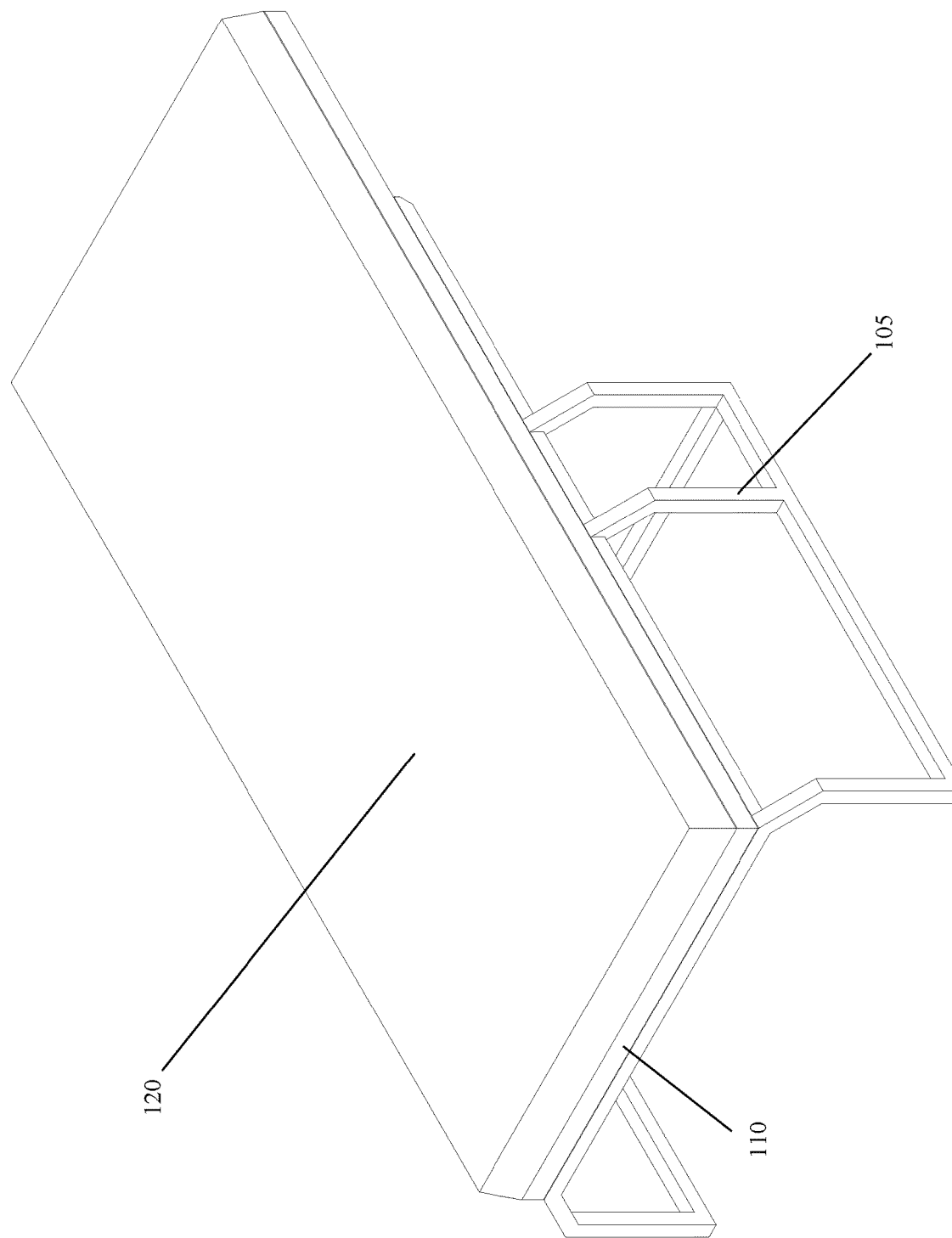
FIG. 4 is a perspective view of a popup camper in a closed position according to an exemplary embodiment of the invention.

FIG. 4 is a perspective view of a popup camper in a closed position according to an exemplary embodiment of the invention. As shown in FIG. 4, in a closed position, the top 120 of the popup camper can be adjacent the bottom 110. A base frame 105 can support the base 110. The base frame 105 can be sized in relative proportions to match the size of a bed of a particular pickup truck. In the closed as shown in FIG. 4, the panels of sidewalls can be neatly folded inwards. In the closed position and with reference to FIG. 2A and FIG. 2B, sidewall 150 can fold inwards such that exterior faces of panels 151 and 152 are adjacent to one another. Sidewall 140 can fold inwards such that exterior faces of panels 141 and 142 are adjacent to one another. End wall 160 can fold inwards (as shown in transition view FIG. 3A and FIG. 3B) such that: exterior faces of panels 163, 165, and 166 are adjacent; exterior faces of panels 164, 167, and 168 are adjacent; exterior faces of panels 163 and 164 are adjacent; interior faces of panels 165 and 167 are adjacent; and interior faces of panels 166 and 168 are adjacent. The popup camper can be maintained in an open or closed position with a gas strut or spring (not shown).

Figure 5:
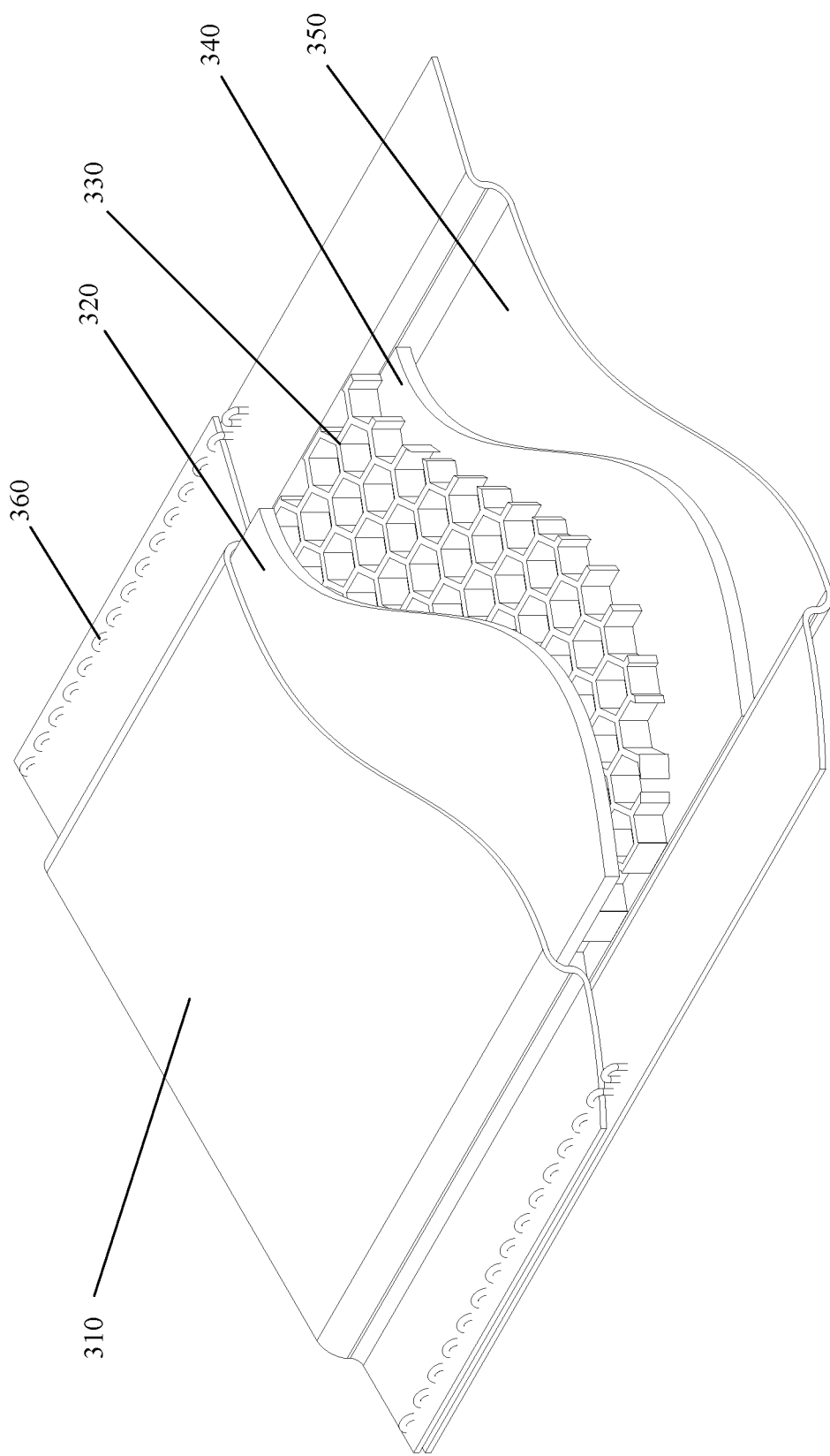
FIG. 5 is a cut away view of a sidewall of a popup camper according to an exemplary embodiment of the invention.

FIG. 5 is a cut away view of a sidewall of a popup camper according to an exemplary embodiment of the invention. As shown in FIG. 5, a side wall can be formed substantially as a sandwich of a fabric layer 310, a foam layer 320, an insulating layer 330, a foam layer 340, and a fabric layer 350. Stitching 360 can connect fabric layer 310 to fabric layer 350. In preferred embodiments of the invention, stitching 360 does not directly penetrate layers 330, 340, or 350 allowing these intermediate layers to float between fabric layers 310 and 350.

Fabric layers 310 and 350 can preferably be formed from a blend of synthetic fabric that is durable yet pliable with some stretching properties. The fabric layers can be formed from a blend of synthetic materials such as nylon or rayon and elastic materials such as rubber or spandex. Foam layers 320 and 340 can be formed from rigid or semi-rigid closed cell foam. Rigid or semi-rigid foam can provide sound dampening, insulation, and give structure to side walls. Insulating layer 330 can be formed from plastic, silicone, or open cell foam. Insulating layer 330 can be rigid, semi-rigid, or generally flexible. Insulating layer 330 have airspace within to trap air and provide insulating properties. Foam layers 320 and 340 can be attached to insulating layer 330 with adhesives or other methods of attachment known in the art. In preferred embodiments, foam layers 320 and 340 are semi-rigid closed cell foam and insulating layer is injection molded plastic.

Although FIG. 5 is illustrated as having a single panel (formed from layers 320, 330, and 340) between fabric layers 310 and 350, the invention contemplates that two or more panels can be disposed between fabric layers. Edges of panels between fabric layers can loosely touch or be adjacent without a rigid connection. When a popup camper is opened or closed, the panels can move slightly between the fabric layers to relieve stress and intermittent binding forces. Depending on the thickness of panels and the number of panels, the panels may have minimal rigid or non rigid connections to the fabric layers to maintain the panels in their relative positions. On one embodiment, one edge of a panel can be attached to an edge of a sidewall while the other edges float. The attachment can be a rigid attachment such as stitching, screws, or a metal hinge, or a semi rigid attachment such as an elastic or fabric connector. This minimal attachment can ensure that panels remain in their relative positions while still allowing them to substantially float between fabric layers.

Figure 6A:
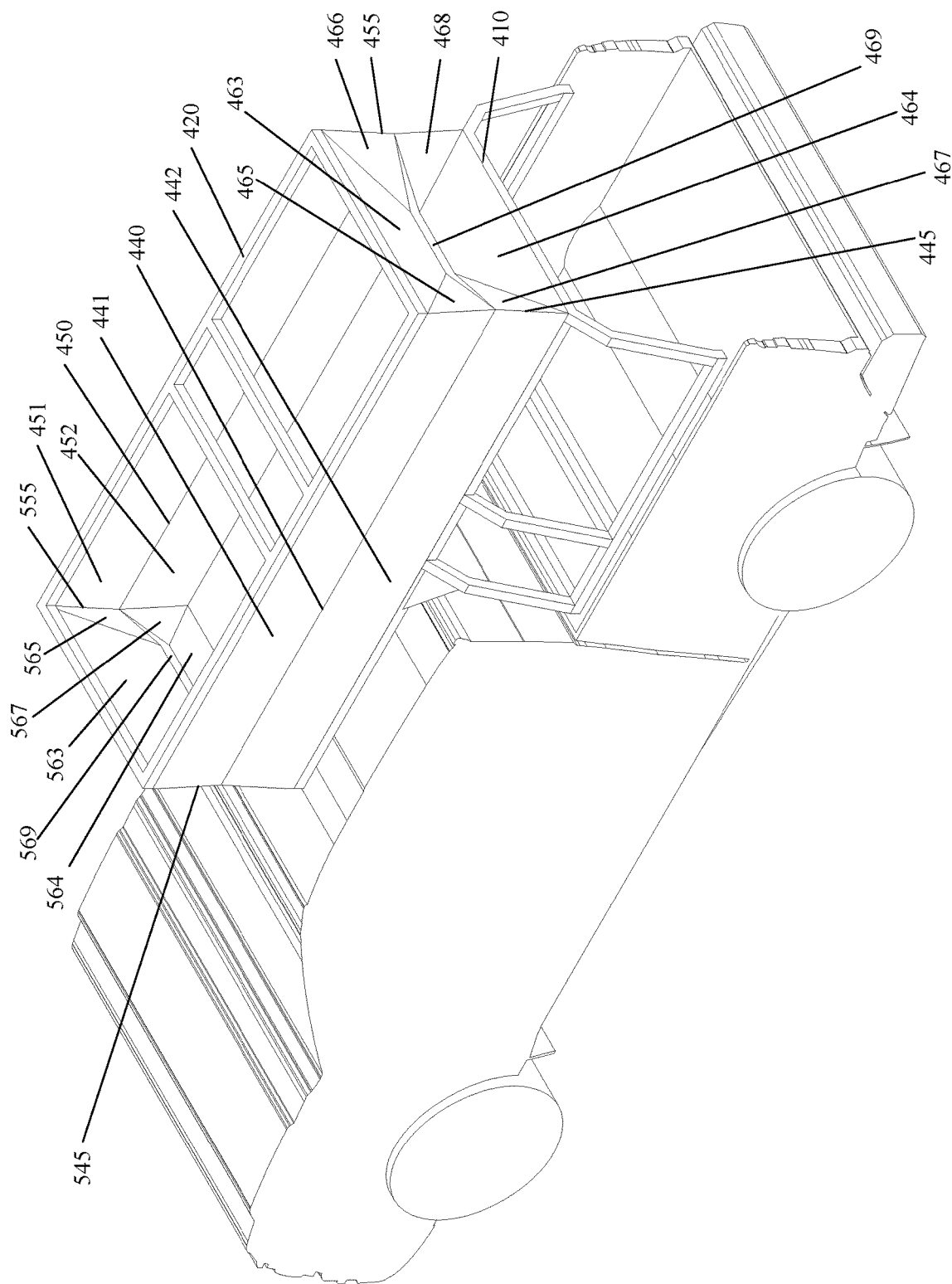
FIG. 6A and FIG. 6B are perspective views of a popup camper in an open position according to an exemplary embodiment of the invention.
Figure 6B:
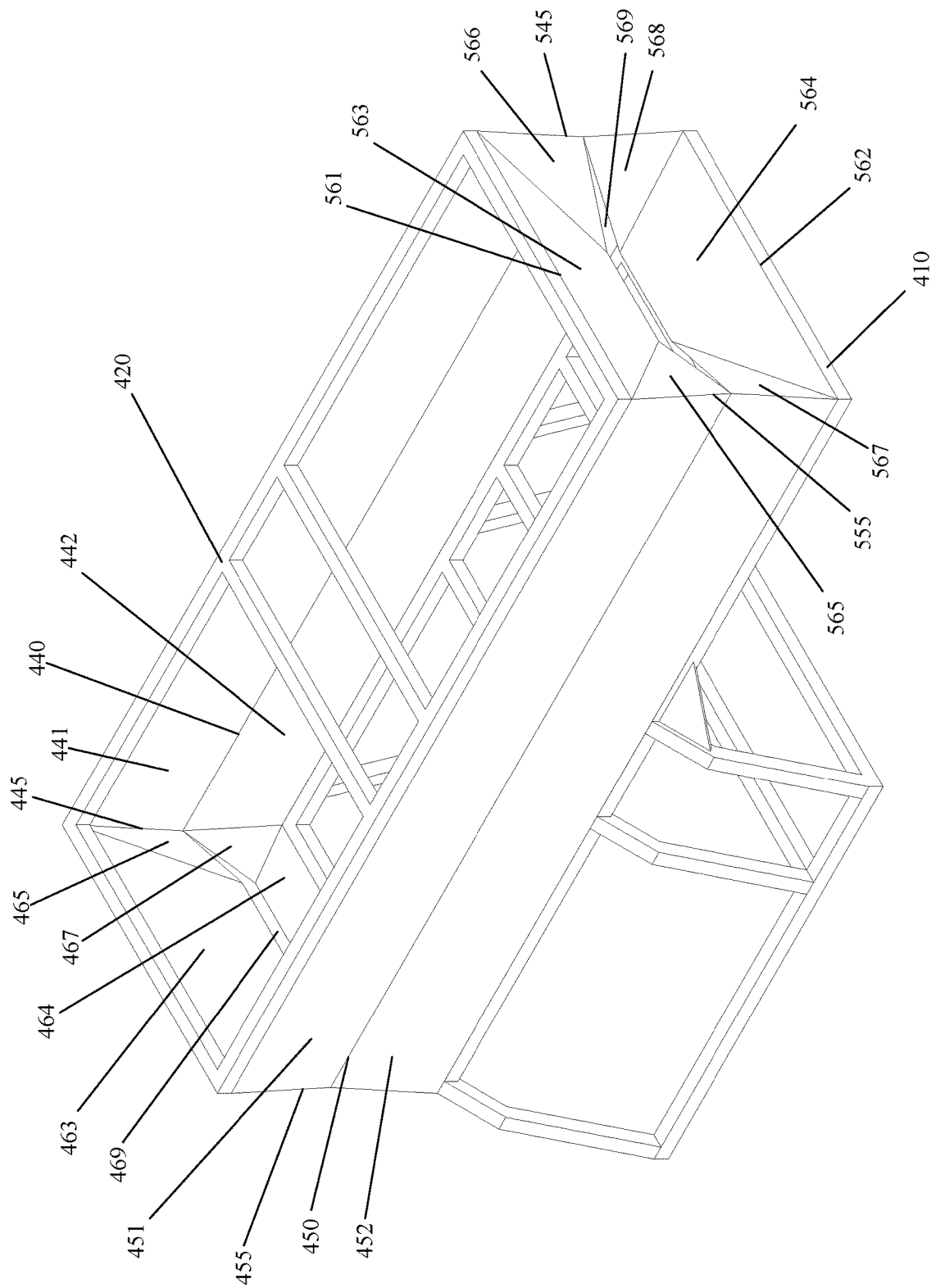

FIG. 6A and FIG. 6B are perspective views of a popup camper in an open position according to an exemplary embodiment of the invention. The embodiment of FIG. 6A and FIG. 6B is similar to that of FIG. 2A and FIG. 2B except that the popup camper of FIG. 6A and FIG. 6B is four-sided rather than the three-sided embodiment of FIG. 2A and FIG. 2B. As shown in FIG. 6A and FIG. 6B, a pop-up camper can have a base 410, a top 420, a left side 440, and a right side 450. An end side can have panels 463, 464, 465, 466, 467, and 468. An opposite end side can have panels 563, 564, 565, 566, 567, and 568. Left side can have edges 445 and 545 connected to end sides. Right side can have edges 555 and 455 connected to end sides.

Panels 451 and 452 of right side and panels 441 and 442 of left side can be rectangular whereas in the embodiment of FIG. 2A and FIG. 2B the analogous panels were triangular. When in an open position rectangular panels 451, 452, 441, and 442 can cause the opposite end to expand where, in contrast to FIG. 2A and FIG. 2B, a hinge 130 connected the base to the top.

Panels of end sides can have analogous function to panels 163, 164, 165, 166, 167, and 168 described in conjunction with FIG. 2A-3B. With reference to FIG. 6B, a longest side of panel 563 can be adjacent to top edge 561 of top 420. A longest side of panel 563 can be adjacent to a bottom edge 562 of bottom 410. Panel 565 can be adjacent edge 555, panel 563, and panel 567. Panel 566 can be adjacent edge 545, panel 563, and panel 568. Panel 567 can be adjacent edge 555, panel 564, and panel 565. Panel 568 can be adjacent edge 545, panel 564, and panel 566.

In transitioning between an open position (shown in FIGS. 6A and 6B) to a closed position, end wall panels 463, 464, 465, 466, 467, and 468 and end wall panels 563, 564, 565, 566, 567, and 568 can have analogous function to panels 163, 164, 165, 166, 167, and 168 (respectively) described in conjunction with FIG. 2A-3B. Gaps 469 and 569 can have analogous function to gap 169 described in conjunction with FIG. 2A-3B.

Figure 7A:
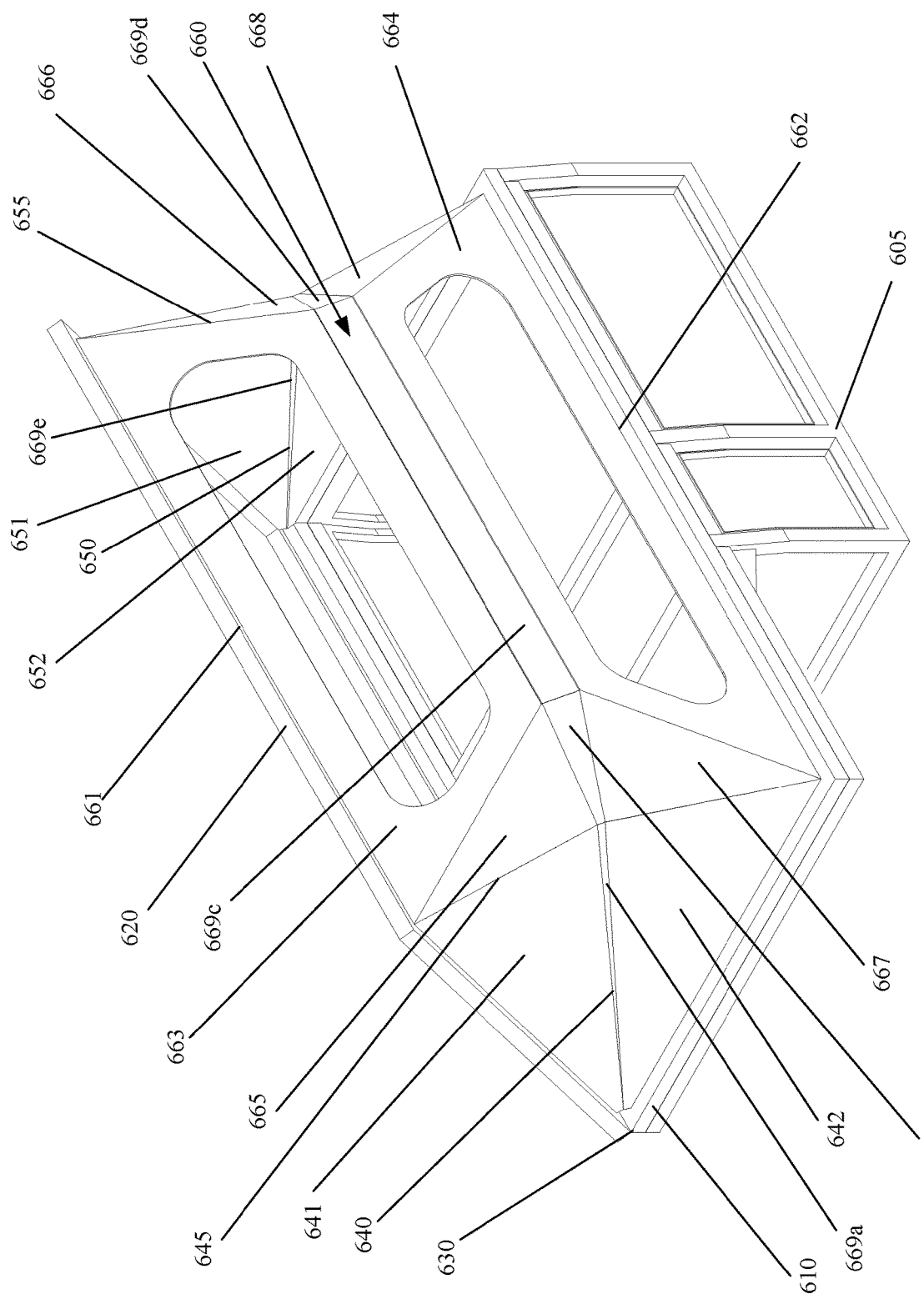
FIG. 7A is a perspective view of a popup camper in an open position according to an exemplary embodiment of the invention.
Figure 7B:
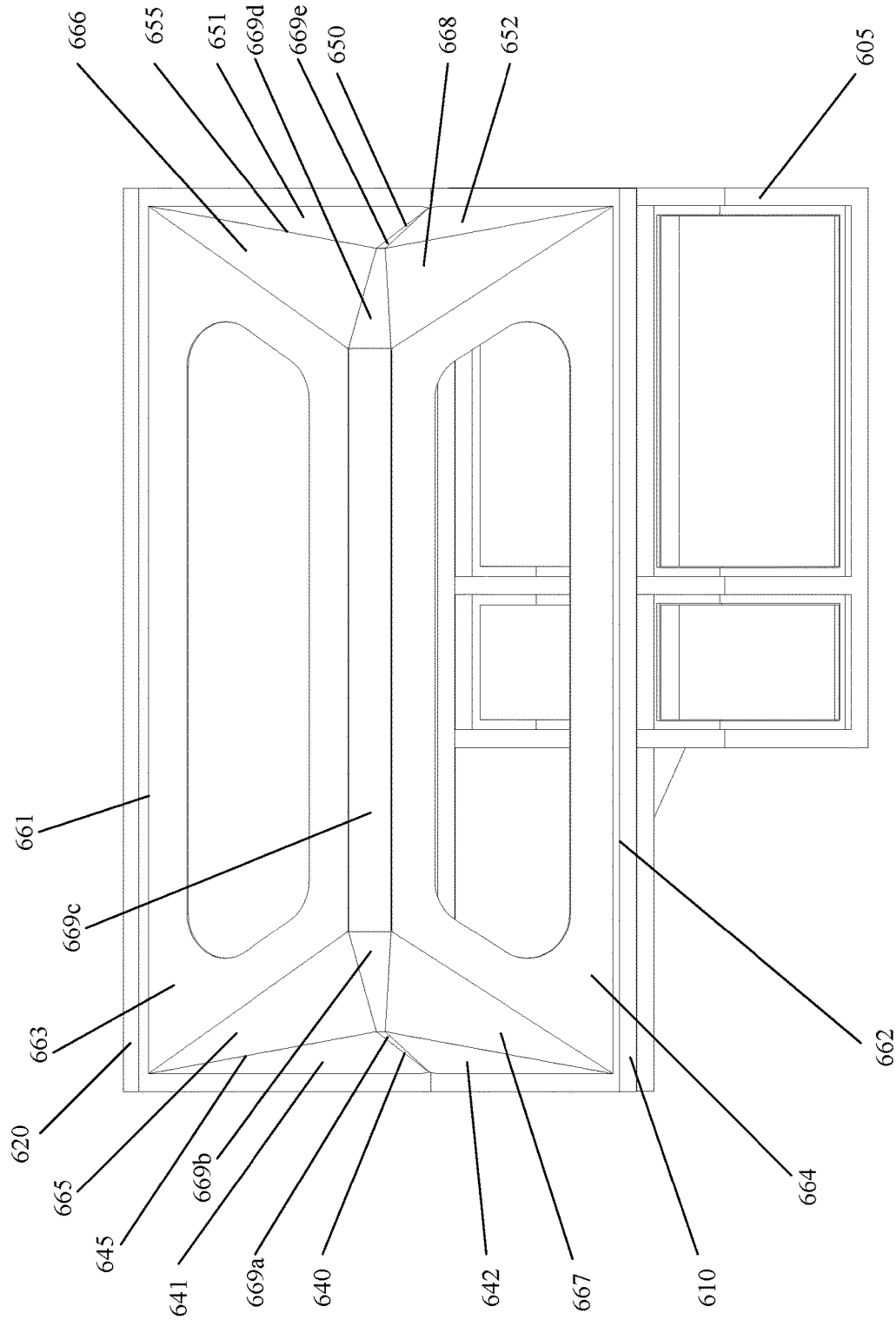
FIG. 7B is a front elevation view of a popup camper in an open position according to an exemplary embodiment of the invention.
Figure 7C:
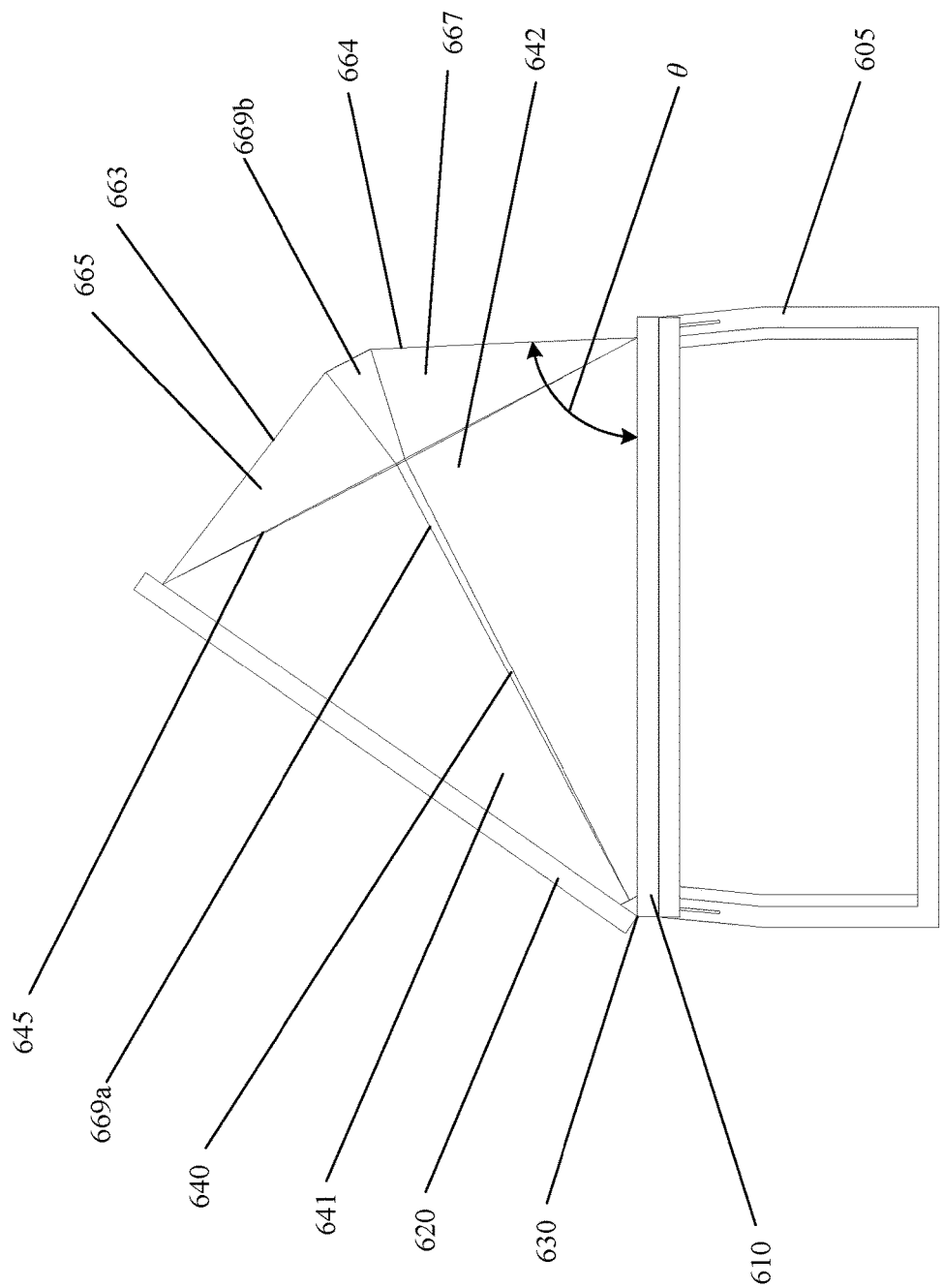
FIG. 7C is a left side view of a popup camper in an open position according to an exemplary embodiment of the invention.

FIG. 7A is a perspective view of a popup camper in an open position according to an exemplary embodiment of the invention, FIG. 7B is a front elevation view of a popup camper in an open position according to an exemplary embodiment of the invention, and FIG. 7C is a left side view of a popup camper in an open position according to an exemplary embodiment of the invention. The embodiment of FIG. 7A-7C is analogous to the embodiment described in conjunction with FIG. 2A-3B except that the popup camper is hinged on a side rather than on an end and the panels can be slightly oversized in comparison to space formed between the base and top in the open position. Hinging on a wide side, rather than a narrow end, can increase the total amount of high head space increasing comfort for users. Similarly, oversized panels can cause a long side to bulge outwards further increasing internal space.

As shown in FIG. 7A, FIG. 7B, and FIG. 7C, a popup camper can include support frame 605, a base 610, a top 620, hinge 630, left side wall 640, right side wall 650, and end wall 660. Left side wall 640 can have panels 641 and 642 and edge 645. Right side wall 650 can have panels 651 and 652 and edge 655. End wall 660 can have edges 661 and 662 and panels 663, 664, 665, 666, 667 and 668. Gaps 669a-669e can relieve binding forces between panels and smooth operation of the pop-up camper.

Left side wall 640 can be attached to top 610 and base 620 and end wall 660 at edge 645. Right side wall 650 can be attached to top 610 and base 620 and end wall 660 at edge 655. End wall 660 can be connected to right side wall 650 at edge 655, left side wall 640 at edge 645, top at edge 661, and bottom at edge 662.

Panels 641 and 642 of left side wall 640 can be slightly larger than necessary to fill the space between base 610 and top 620 in the open position. Panels 651 and 652 of right side wall 650 can be slightly larger than necessary to fill the space between base 610 and top 620. In preferred embodiments of the invention, the left side wall 640 and right side wall 650 are slightly pinched inwards (as shown in FIG. 7B) to account for the slightly oversized panels.

Oversized side panels 641, 642, 651, and 652 can have cascading, unexpected benefits on panels 663, 664, 665, 666, 667 and 668. For example, by pinching in panel 642 the angle of edge 645 is altered and pushes panel 667 downwards and outwards. This in turn pushes panel 664 even further outwards and increases gaps 669b-669d. As shown in FIG. 7C, the pinching in of panel 642 has caused a bulge in end wall 660 and pushed panel 667 to angle θ. Angle θ is preferably at least 75 degrees and preferably about 90 degrees. This further increases usable space inside the popup camper and increases the comfort of that space.

When compared to an end-hinging popup camper such as disclosed in FIGS. 2A-3B, a side-hinging popup camper such as disclosed in FIG. 6A-6B can have more internal space and more headroom where one of the longest wall 664 is substantially vertical with respect to the base thereby maximizing usable space. Where a popup camper is approximately the dimensions of the bed of a pickup truck, the popup camper of FIGS. 2A-3B allows substantially one person to sit upright near the narrow end wall 160 and perhaps two people depending on how closely they are willing to share space. In contrast, the popup camper of FIG. 6A-6B has an end wall that is substantially the length of the bed of the pickup and allows two or more people to comfortably sit upright against end wall 660.

It will be apparent to those skilled in the art that various modifications and variations can be made in the popup camper without departing from the spirit or scope of the invention. Thus, it is intended that embodiments of the invention cover the modifications and variations of this invention provided they come within the scope of the appended claims and their equivalents.

What is claimed is:

1. A popup camper comprising:
   a base;
   a top;
   an end wall connecting the base to the top, the end wall having a plurality of rigid panels;
   a hinge connecting the base and the top, the hinge opposite the end wall;
   a major folding line bisecting the end wall;
   a plurality of panels of the end wall;
   wherein each of the plurality of panels of the end wall has an edge on the major folding line;
   wherein the top can be disposed in an open position and a folded position;
   wherein in the open position, the top is hingedly rotated away from the base to form an interior space between the base, top, and end wall;
   wherein in the folded position the top is hingedly rotated towards the base collapsing the interior space; and
   wherein the end wall remains connected to each of the top and the base when transitioning between the open position and the folded position.

2. The popup camper of claim 1 further comprising:
   a first minor folding line extending from a first corner of the end wall to the major folding line;
   a second minor folding line extending from a second corner of the end wall to the major folding line;
   a third minor folding line extending from a third corner of the end wall to the major folding line; and
   a fourth minor folding line extending from a fourth corner of the end wall to the major folding line.

3. The popup camper of claim 2 further comprising:
   a first panel of the plurality of panels;
   a second panel of the plurality of panels;
   a third panel of the plurality of panels;
   a fourth panel of the plurality of panels;
   a fifth panel of the plurality of panels;
   a sixth panel of the plurality of panels;
   wherein the first and third panels have an edge on the first minor folding line;
   wherein the first and fourth panels have an edge on the second minor folding line;
   wherein the fifth and second panels have an edge on the third minor folding line; and
   wherein the second and sixth panels have an edge on the fourth minor folding line.

4. The popup camper of claim 3 wherein, in the folded position, an outside face of the first panel is adjacent an outside face of the second panel, an inside face of the third panel is adjacent and inside face of the fifth panel, and inside face of the fourth panel is adjacent and inside face of the sixth panel, and the third, fourth, fifth, and sixth panels are partially disposed between the first and second panels.

5. A popup camper comprising:
a base;
a top;
a first sidewall having a first edge;
a second sidewall having a second edge;
a third sidewall connected to the first sidewall at the first edge, connected to the second sidewall at the second edge, connected to the top at a third edge, and connected to the base at a fourth edge, the third sidewall having a plurality of rigid panels;
a hinge connecting the base and the top, the hinge opposite the third sidewall;
wherein the top can be disposed in an open position or a folded position;
wherein in the open position the top is hingedly rotated away from the base to form an interior space between the top, base, first sidewall, second sidewall, and third sidewall;
wherein in the folded position the top is hingedly rotated towards the base collapsing the interior space; and
wherein the third sidewall remains connected to each of the first sidewall, second sidewall, top, and base when transitioning between the open position and the folded position.

6. The popup camper of claim 5 further comprising
a first panel of the third sidewall;
a second panel of the third sidewall;
a third panel of the third sidewall;
a fourth panel of the third sidewall;
a fifth panel of the third sidewall;
a sixth panel of the third sidewall;
wherein the first panel is adjacent to the third edge, the second panel, the third panel, and the fourth panel;
wherein the second panel is adjacent to the base, the first panel, the fifth panel, and the sixth panel;
wherein the third panel is adjacent the first edge, the first panel, and the fifth panel;
wherein the fourth panel is adjacent the first panel, the second edge, and the sixth panel;
wherein the fifth panel is adjacent the first edge, the second panel, and the third panel; and
wherein the sixth panel is adjacent the second panel, the second edge, and the fourth panel.

7. The popup camper of claim 6 wherein a longest edge of the first panel is adjacent the third edge and a longest edge of the second panel is adjacent the fourth edge.

8. The popup camper of claim 6 wherein a longest edge of the third panel is adjacent the first panel.

9. The popup camper of claim 6 further comprising:
an outer fabric layer of the third sidewall;
an inner fabric layer of the third sidewall; and
wherein the first, second, third, fourth, fifth, and sixth panels are disposed between the inner and outer fabric layers.

10. The popup camper of claim 9 wherein at least one of the first, second, third, fourth, fifth, and sixth panels float between the inner and outer fabric layers.

11. The popup camper of claim 5 further comprising:
a seventh panel of the first sidewall;
an eighth panel of the first sidewall;
a ninth panel of the second sidewall;
a tenth panel of the second sidewall;
wherein the seventh panel is adjacent the top, the first edge, and the eighth panel;
wherein eighth panel is adjacent the base, the first edge and the seventh panel;
wherein the ninth panel is adjacent the top, the second edge, and the tenth panel; and
wherein the tenth panel is adjacent the base, the second edge, and the ninth panel.

12. The popup camper of claim 5 wherein in the folded position, the third sidewall is folded inwards narrowing the internal space.

13. A popup camper comprising:
a base;
a top;
a collapsible sidewall having a plurality of rigid panels;
a first edge of the collapsible sidewall;
a second edge of the collapsible sidewall;
a third edge of the collapsible sidewall connected to the top;
a fourth edge of the collapsible sidewall connected to the base;
a hinge connecting the base and the top, the hinge opposite the collapsible sidewall;
wherein the popup camper can be disposed in an open position or a folded position;
wherein in the open position, the top is hingedly rotated away from the base to form an interior space between the top, base, and collapsible sidewall;
wherein in the folded position the top is hingedly rotated towards the base collapsing the interior space; and
wherein the collapsible sidewall remains connected to each of the top and the base when transitioning between the open position and the folded position.

14. The popup camper of claim 13 further comprising:
a major folding line of the collapsible sidewall;
a first minor folding line of the collapsible sidewall extending from a first corner of the collapsible sidewall to the major folding line;
a second minor folding line of the collapsible sidewall extending from a second corner of the collapsible sidewall to the major folding line;
a first panel of the collapsible sidewall;
  a longest edge of the first panel adjacent the third edge of the collapsible sidewall;
  a second edge of the first panel adjacent the major folding line;
  a third edge of the first panel adjacent the first minor folding line;
  a fourth edge of the first panel adjacent the second minor folding line;
a second panel of collapsible sidewall;
  a longest edge of the second panel adjacent the fourth edge of the collapsible sidewall;
  a second edge of the second panel adjacent the major folding line and the second edge of the first panel;
a third panel of the collapsible sidewall;
  a longest edge of the third panel adjacent the third edge of the first panel and the first minor folding line;
  a second edge of the third panel adjacent the major folding line; and
  a third edge of the third panel adjacent the first edge of the collapsible sidewall.

15. The popup camper of claim 14 wherein, in the open position, the first, second, and third panels are substantially planar, wherein in the folded position, the third panel is partially disposed between the first and second panels, wherein in both of the open position and the folded position, the collapsible sidewall is connected to both the base and the top.

16. The popup camper of claim 14 further comprising:
a third minor folding line of the collapsible sidewall extending from a third corner of the collapsible sidewall to the major folding line;
a fourth minor folding line of the collapsible sidewall extending from a fourth corner of the collapsible sidewall to the major folding line;
a fourth panel of the collapsible sidewall;
   a longest edge of the fourth panel adjacent the fourth edge of the first panel and the second minor folding line;
   a second edge of the fourth panel adjacent the major folding line;
   a third edge of the fourth panel adjacent the second edge of the collapsible sidewall;
a fifth panel of the collapsible sidewall;
   a longest edge of the fifth panel adjacent a third edge of the second panel and the fourth minor folding line;
   a second edge of the fifth panel adjacent the major folding line;
   a third edge of the fifth panel adjacent the first edge of the collapsible sidewall;
a sixth panel of the collapsible sidewall;
   a longest edge of the sixth panel adjacent a fourth edge of the second panel and the third minor folding line;
   a second edge of the sixth panel adjacent the major folding line; and
   a third edge of the sixth panel adjacent the second edge of the collapsible sidewall.

17. The popup camper of claim 14 further comprising:
an outer fabric layer of the collapsible sidewall;
an inner fabric layer of the collapsible sidewall; and
wherein the at least one of the first, second, and third panels floats between the inner and outer fabric layers.

\* \* \* \* \*